United States Patent [19]

Naruse

[11] Patent Number: 5,201,245
[45] Date of Patent: Apr. 13, 1993

[54] DRIVE CONTROL SYSTEM FOR AN AUTOMOBILE

[76] Inventor: Masuyuki Naruse, 603, Noguchi, Ooaza, Taimei-machi, Tamana-gun, Kumamoto-ken, Japan

[21] Appl. No.: 734,035

[22] Filed: Jul. 23, 1991

Related U.S. Application Data

[63] Continuation-in-part of Ser. No. 532,423, Jun. 4, 1990, abandoned.

[30] Foreign Application Priority Data

Sep. 29, 1989 [JP] Japan ................... 1-256638
Apr. 17, 1990 [JP] Japan ................... 2-99428

[51] Int. Cl.$^5$ ............................................. G05G 1/18
[52] U.S. Cl. .................................... 74/564; 74/560; 36/59 R; 280/612; 403/DIG. 1
[58] Field of Search .................. 74/560, 564, 512; 403/DIG. 1; 36/59 R, 61; 280/612; 180/90.6

[56] References Cited

U.S. PATENT DOCUMENTS

| | | | |
|---|---|---|---|
| 1,715,336 | 5/1929 | Cocks | 74/564 X |
| 1,951,284 | 3/1934 | Kramer | 74/564 |
| 2,444,342 | 6/1948 | Edwards | 74/564 |
| 2,761,329 | 9/1956 | Reed | 74/564 |
| 3,108,651 | 10/1963 | Miller | 74/560 |
| 3,275,094 | 9/1966 | Kennedy | 74/564 |
| 3,537,719 | 11/1970 | Gottfried | 280/612 |
| 3,828,625 | 8/1974 | Bruhn | 74/512 |
| 4,043,217 | 8/1977 | Kleist | 74/560 |
| 4,108,452 | 8/1978 | Baron | 36/59 R |
| 4,802,381 | 2/1989 | Hsin-Hsin | 74/564 |
| 5,061,112 | 10/1991 | Monford | 403/DIG. 1 |

FOREIGN PATENT DOCUMENTS 0184222  8/1987  Japan ............................ 403/DIG. 1

*Primary Examiner*—Vinh T. Luong
*Attorney, Agent, or Firm*—Nikaido, Marmelstein, Murray & Oram

[57] ABSTRACT

A drive control system for an automobile which has a heel support pivot on the floor of the automobile at a position opposite to the brake pedal in front of driver's seat. The brake pedal and the accelerator pedal are placed on the circle drawn by the ball of the foot when the foot is rotated about the heel on the heel support pivot, thereby permitting the driver to selectively operate the brake pedal or the accelerator pedal by rotating the foot about the heel.

4 Claims, 3 Drawing Sheets

DRIVE CONTROL SYSTEM FOR AN AUTOMOBILE

This application is a continuation-in-part of application Ser. No. 532,423, filed Jun. 4, 1990, abandoned.

BACKGROUND OF THE INVENTION

1. Field of the Invention

The present invention relates to a drive control system for an automobile, and particularly to a safe drive control system having foot-operating pedals on the floor of an automobile.

2. Description of the Prior Art

A brake pedal and an accelerator pedal are usually arranged side by side on the floor of an automobile. The push stroke which is required for the operation of the brake pedal is much longer than that for the accelerator pedal, and therefore, a relatively large motion of the leg about the hip joint together with an associated shifting of the heel position is required for pushing and moving the brake pedal through its full stroke.

This leg-and-foot composite motion is relatively large and therefore, it is likely that an accident is caused when a quick motion is required for sudden stopping in an emergency. Specifically, when the driver puts his heel at a somewhat different position, it happens that the driver pushes the accelerator pedal when a sudden stopping is required in an emergency. It is reported that this sort of accident is liable to take place particularly in an automatic automobile in which one foot is used to operate the different pedals while the other foot remains stationary on the floor, and therefore the driver does not use his feet rhythmically, as is not the case with an ordinary automobile in which the driver uses his feet rhythmically with one foot on the clutch pedal and with the other foot on the accelerator or brake pedal. One foot operation may cause the driver to have difficulty somewhat in rhythmically shifting his foot to right position.

There is nothing to support or retain the foot in position while operating on the flat floor, and therefore upon deceleration or stopping the center of gravity of the driver's body is liable to move forward under its inertia, whereby the driver's weight is applied to the brake pedal or the accelerator pedal, or the driver's leg is apt to stiffen in an emergency, thus causing the sudden stopping or starting. This may be a cause for bumping the car ahead, or skidding on the road.

There is nothing to retain his foot firmly on the floor, the driver must keep his balance by gripping the steering wheel. This causes him to get tired while driving.

SUMMARY OF THE INVENTION

The object of the present invention is to provide a car drive control system which permits the heel of the foot to support the driver's weight while operating the brake pedal or the accelerator pedal, thereby permitting the quick operation of a selected pedal and eliminating a wrong pedal operation to assure the safe driving.

To attain this object a drive control system for an automobile according to the present invention comprises a heel support pivot on the floor of said automobile at a position opposite to the brake pedal in front of driver's seat, the brake pedal and the accelerator pedal being placed on the circle drawn by the ball of the foot when the foot is rotated about the heel on said heel support pivot, thereby permitting the driver to selectively operate the brake pedal or the accelerator pedal by rotating the foot about the heel. With this arrangement the driver can selectively operate either pedal by rotating his foot with the heel staying on the heel support pivot. The driver can operate a selected pedal while supporting his weight on the heel, thus permitting him to keep his balance on his feet. Pedal operation requires only a small foot motion about the heel rather than a large leg motion about the hip joint. This permits the driver's posture to be stable, and even in an automatic automobile in which a single foot is used in driving the automobile, the driver can use his foot rhythmically. Upon deceleration or stopping the center of gravity of the driver's body is liable to move forward under its inertia. On that occasion the driver's weight will not be applied to the brake pedal or the accelerator pedal thanks to retaining the heel of the foot on the heel support pivot. The load on the driver's arms in keeping his balance by gripping the steering wheel can be reduced, and his posture will be free of stiffening. Therefore, he will not get tired while driving. The heel support pivot is placed at a position just opposite to the brake pedal in front of the driver's seat. In other words the heel support pivot and the brake pedal are laid on the straight line on which the foot is laid. This arrangement allows the foot to naturally operate the brake pedal in an emergency.

The upper surface of the brake pedal is preferably at the sane level as the upper surface of the accelerator pedal or at a level lower than the upper surface of the accelerator pedal. This pedal arrangement at same or somewhat different levels allows the foot to switch from the accelerator pedal to the brake pedal smoothly and quickly. The brake stroke required for applying the brakes is determined so as to permit driver's foot to make such brake stroke with the heel remaining on said heel support pivot. Such brake stroke is relatively short. This short brake stroke along with the small circular motion of the foot about the heel permits braking control through delicate motion.

The brake pedal may have a guide extension inclined downwards from its edge on the side of the accelerator pedal, and a stop extension rising from its edge on the side which is opposite to the guide extension. The guide extension allows the foot to come to rest on the surface of the brake pedal smoothly, preventing insufficient braking operation which otherwise, might be caused by collision of the foot against the side of the brake pedal when the foot position is switched from the accelerator pedal to the brake pedal. Also, the stop extension prevents the foot from overrunning the brake pedal leftwards when the foot position is shifted from the accelerator pedal to the brake pedal or from being put apart from the right position on the brake pedal.

The heel support pivot may comprise a recess on the floor, which recess is large enough to accommodate the heel, thereby permitting rotation of the heel in it. Otherwise, the heel support pivot may comprise a projection on the floor, thereby permitting rotation of the foot with the heel remaining on the projection. The recess or projection may have a bearing attached thereto, thereby assuring smooth rotation of the foot about the heel.

The heel support pivot may have a magnet, and the shoe's heel may have a magnetic piece and vice versa, thereby permitting the driver to put his shoe on the heel support pivot in position.

Other objects and advantages of the present invention will be understood from the following description of preferred embodiments of the present invention, which are shown in accompanying drawings:

PREFERRED EMBODIMENTS OF THE INVENTION

Figure 1:
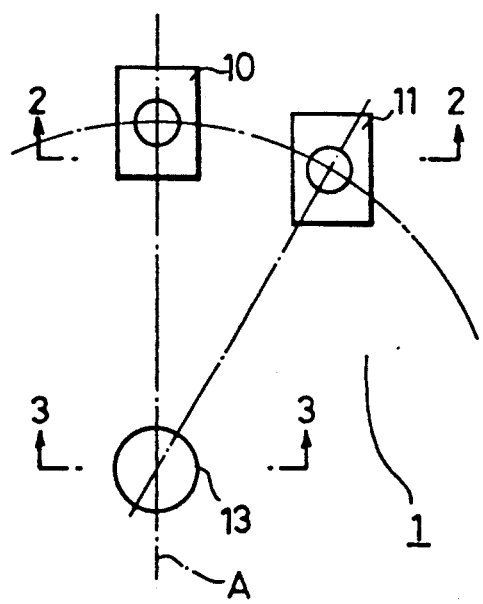
FIG. 1 shows the arrangement of accelerator and brake pedals with respect to a heel support pivot in a drive control system according to the present invention.

Referring to FIG. 1, brake pedal 10 and accelerator pedal 11 are arranged side by side on the floor of the driver's seat. Heel support pivot 13 is placed at a position opposite to brake pedal 10. The right foot is laid on the line A extending between heel support pivot 13 and brake pedal 10. Brake pedal 10 and accelerator pedal 11 are placed on the circle drawn by the ball of the foot when the foot is rotated about the heel on heel support pivot 13, thereby permitting the driver to selectively operate brake pedal 10 or accelerator pedal 11 by rotating the foot about the heel without displacing the heel position.

Figure 2:
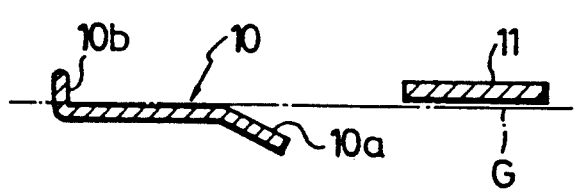
FIG. 2 is a sectional view taken along the line 2—2 in FIG. 1.

The upper surface of brake pedal 10 is at the same level as the upper surface of accelerator pedal 11 or at a level lower than the upper surface of accelerator pedal 11. The brake stroke required for applying the brakes is determined so as to permit driver's foot to make such brake stroke with the heel remaining on heel support pivot 13. Also, as shown in FIG. 2, brake pedal 10 has guide extension 10a inclined downwards from its edge on the side of the accelerator pedal, and brake pedal 10 has stop extension 10b rising from its edge on the side which is opposite to guide extension 10a. Guide incline 10a permits a smooth guide of the foot to brake pedal 10 from accelerator pedal 11 without collision of the foot against the side of brake pedal 10, and the stop extension 10b prevents the foot from moving beyond the edge of brake pedal 10. Thus, the driver can put his right foot in the correct braking position quickly.

Figure 3:
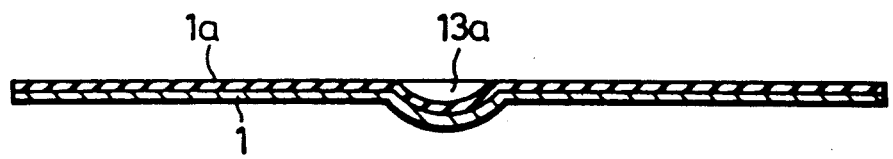
FIG. 3 is a sectional view taken along the line 3—3 in FIG. 1.
Figure 4:
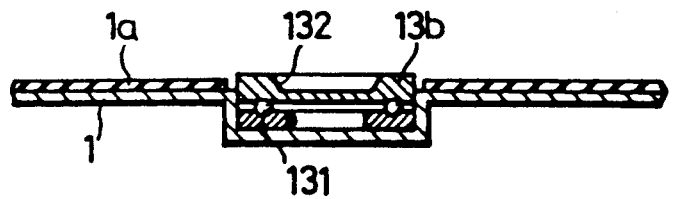
FIG. 4 is a longitudinal section of a second embodiment of the invention utilizing a heel support pivot.

As shown in FIG. 3, heel support pivot 13 is semispherical recess 13a on the floor. It is large enough to accommodate the heel, permitting rotation of the heel in it while supporting the driver's weight. Alternatively, as shown in FIG. 4, heel retainer 132 may have annular ridge 13b integrally connected to its circumference, and such heel retainer may be combined with bearing 131. The retainer-and-bearing integration may be fitted in the recess on the floor. This arrangement makes it easy to catch the heel, assuring smooth rotation of the foot.

Figure 7:
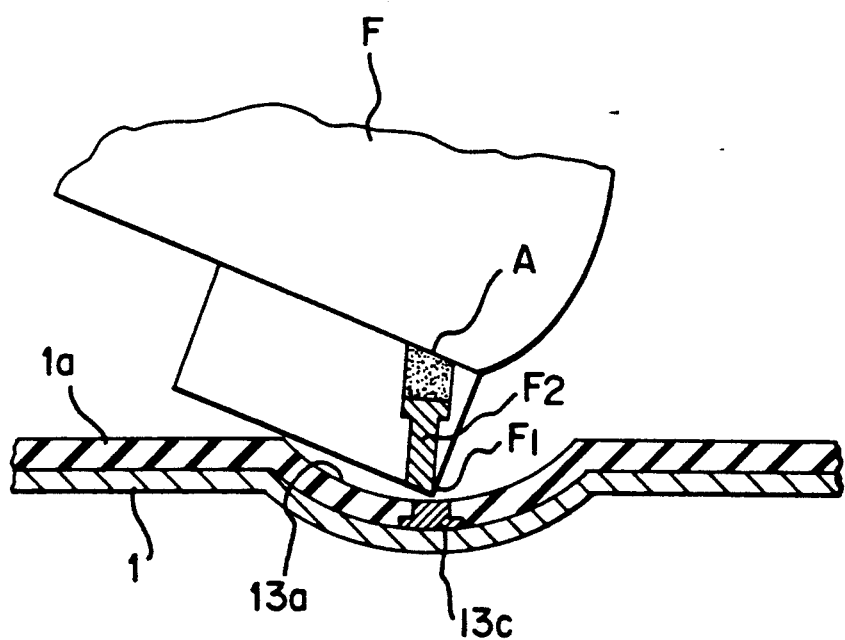
FIG. 7 shows a third embodiment of the invention utilizing a magnet as part of the heel support pivot.

Recess 13a or projection 13b may have a magnet (or a magnetic metal piece), and shoe's heel may have a magnetic piece (or a magnet), thereby permitting the driver to put his shoe on heel support pivot 13 in position without fail. FIG. 7 illustrates an embodiment of the invention where magnet piece 13c is fixed at the bottom of recess 13a. A cylindrical magnetic metal piece F2 is fixed to an opposing shoe heel F1. In this embodiment, magnetic piece F2 is inserted into a hole in the heel. Adhesive "A" is used to permanently affix the magnetic metal piece F2 to the heel. Other known methods of attaching a magnet metal piece to a shoe heel may be used; this drawing only illustrates one method of fixing a magnet piece to a shoe heel.

Figure 5:
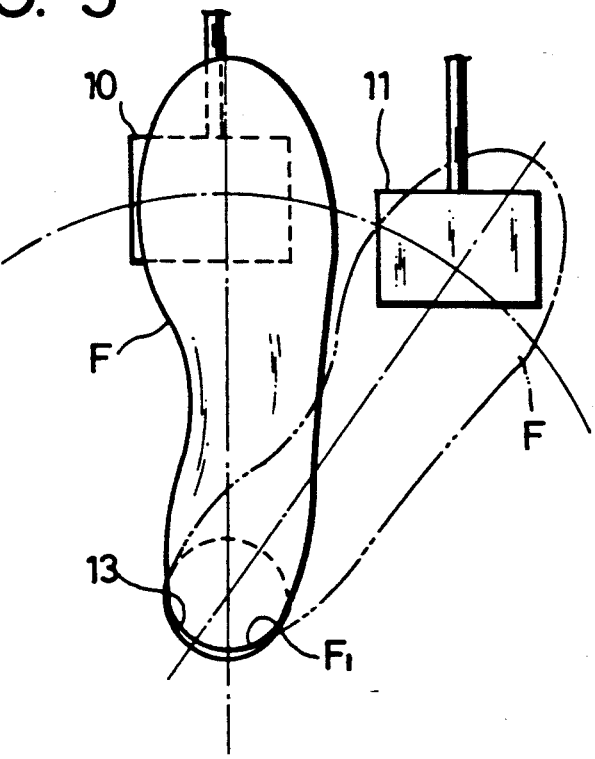
FIG. 5 shows how the foot operates a selected pedal.
Figure 6:
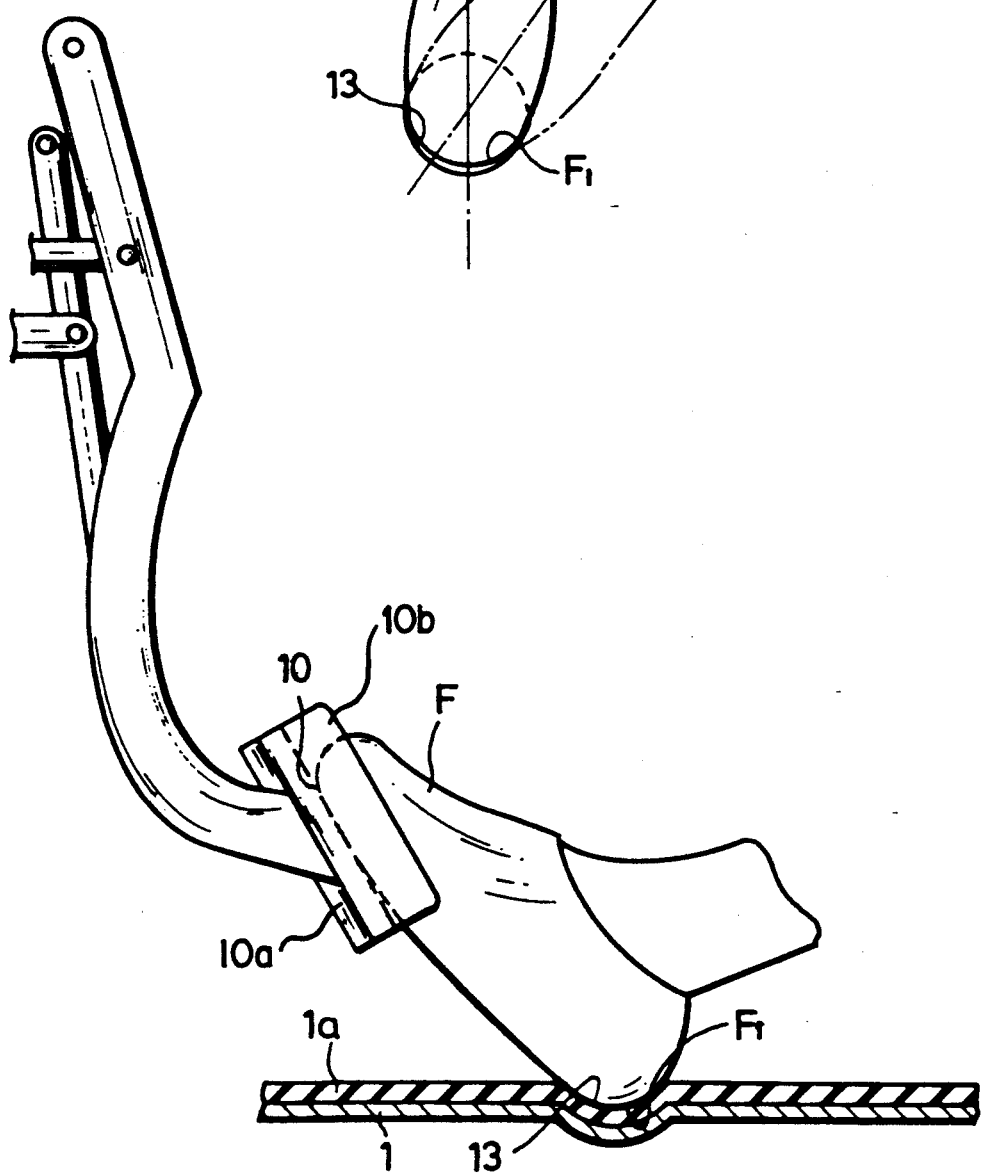
FIG. 6 is a side view showing how the foot operates the selected pedal.

In operation, as shown in FIGS. 5 and 6, the driver puts the heel F1 of his shoe on heel support pivot 13, and he can selectively operate either pedal simply by rotating the foot about the heel, which remains on heel support pivot 13. While operating the selected pedal, the driver's weight is applied to the heel F1 of the foot F, and a small push on the selected pedal attains required pedal operation.

This small foot motion with the heel remaining stationary is advantageous to keep the driver's balance without recourse to his hands on the steering wheel. Upon acceleration or stopping the driver's body is liable to move forward under its inertia. On that occasion the driver can use the heel F1 of his right foot along with his left foot to support his weight, thus preventing application of his weight to a selected pedal, and hence preventing excessive push on the selected pedal.

As may be understood from the above, the drive control system according to the present invention provides advantages as follows:

1) The driver can selectively operate the brake pedal or the accelerator pedal with the heel staying on the heel support pivot. This permits the driver to keep his balance on his feet. Pedal operation requires only a small foot motion about the heel rather than a large leg motion about the hip joint. This has the effect of preventing the driver from getting tired in driving, assuring that he can perform the delicate pedal operation. In particular, the driver's posture can be kept stable, and even in an automatic automobile in which only a single foot is used in driving the automobile, the driver can use his foot so rhythmically that no erroneous pedal operation is caused.

2) Upon deceleration or stopping the driver's body is liable to move forward under its inertia. On that occasion the driver's weight will not be applied to the brake pedal or the accelerator pedal, and therefore reduce the risk of accidents caused by excessive pedal advance.

3) The shift of the foot from the accelerator pedal to the brake pedal or vice versa can be performed smoothly and quickly. The brake stroke required for applying the brakes is relatively short, because it is determined so as to permit driver's foot to make such brake stroke with the heel remaining on said heel support pivot. This short brake stroke allows required braking control through delicate motion.

4) The guide incline of the brake pedal allows the foot to come to rest on the brake pedal in position, preventing incomplete braking operation which otherwise might be caused by collision of the foot against the side of the brake pedal when the foot position is switched from the accelerator pedal to the brake pedal. The stop extension of the brake pedal prevents the foot from overrunning the brake pedal leftwards when the foot position is shifted from the accelerator pedal to the brake pedal.

5) The heel support pivot may be a recess made on the floor, or a projection rising from the floor. The recess or projection may have a bearing attached thereto, thereby assuring smooth rotation of the foot about the heel.

The heel support pivot may have a magnet, and the shoe's heel may have a magnetic piece and vice versa, thereby permitting the driver to put his shoe on the heel support pivot in position without fail.

I claim:

1. An operator positioning apparatus in which a floor structure for an automobile cooperates with a shoe heel, said apparatus comprising:
   a heel support pivot firmly and non-resiliently supporting the shoe heel at a position opposite a brake pedal, wherein said heel support pivot comprises a recess formed in said floor structure to rotatably support the shoe heel, and a first magnet disposed in said recess; and said apparatus further comprises a second magnet disposed in the shoe heel used by an operator of the automobile;
   wherein said first and said second magnets are disposed to attract each other, thereby aiding the operator in placing the shoe heel on said support pivot.

2. An operator positioning apparatus as recited in claim 1, wherein said brake pedal includes a guide extension inclined downwards from an edge opposing an accelerator pedal.

3. An operator positioning apparatus as recited in claim 2, wherein said brake pedal further includes a stop extension rising from an edge opposite said guide extension.

4. An operator positioning floor structure for an automobile as recited in claim 1, wherein said recess is formed in a substantially hemispherical shape.

* * * * *